United States Patent
Wang et al.

(10) Patent No.: US 9,601,753 B2
(45) Date of Patent: Mar. 21, 2017

(54) NEGATIVE ACTIVE MATERIALS, LITHIUM ION BATTERIES, AND METHODS THEREOF

(75) Inventors: Qiang Wang, Shenzhen (CN); Lu Zhang, Shenzhen (CN); Li Ma, Shenzhen (CN); Yan Zhu, Shenzhen (CN); Zhenyue Wu, Shenzhen (CN)

(73) Assignee: BYD COMPANY LIMITED (CN)

( * ) Notice: Subject to any disclaimer, the term of this patent is extended or adjusted under 35 U.S.C. 154(b) by 1008 days.

(21) Appl. No.: 13/212,322

(22) Filed: Aug. 18, 2011

(65) Prior Publication Data

US 2012/0045687 A1 Feb. 23, 2012

(30) Foreign Application Priority Data

Aug. 19, 2010 (CN) .......................... 2010 1 0260247

(51) Int. Cl.
*H01B 1/24* (2006.01)
*H01M 4/133* (2010.01)
(Continued)

(52) U.S. Cl.
CPC ........... *H01M 4/133* (2013.01); *C04B 35/532* (2013.01); *C04B 35/63488* (2013.01);
(Continued)

(58) Field of Classification Search
CPC ........... H01M 4/36; H01M 4/04; H01M 4/38; H01M 2/04; H01M 4/583; H01M 4/60; H01M 4/64; H01M 4/133; H01M 4/131; H01M 4/134; H01M 4/1391; H01M 4/1393; H01M 4/1395; H01M 4/366; H01M 4/387; H01M 4/587; H01M 10/0525; H01B 1/24;
(Continued)

(56) References Cited

U.S. PATENT DOCUMENTS 5,580,538 A * 12/1996 Bito et al. ................. 423/447.4
6,589,696 B2 * 7/2003 Matsubara et al. ........ 429/231.8
(Continued)

FOREIGN PATENT DOCUMENTS

CN 1194431 C 3/2005
CN 100375319 C 3/2008
(Continued)

OTHER PUBLICATIONS

Machine Translation of CN101740764. Ruian et al. "Tin-graphite composite cathode material for lithium ion battery and preaprion method thereof" Published Jun. 16, 2010. 12 pages total.*
(Continued)

*Primary Examiner* — Danny N Kang
(74) *Attorney, Agent, or Firm* — Greenberg Traurig LLP

(57) ABSTRACT

Methods of preparing negative active materials and negative active materials are provided herein. The preparation methods include: A) mixing a carbon material, an organic polymer, a Sn-containing compound—optionally with water—to obtain a mixed solution system; B) adding a complexing agent into the mixed solution system obtained in step A optionally while stirring to form an intermediate solution; C) adding a reducing agent into the intermediate solution obtained in step B to a reaction product; D) optionally filtering, washing and then drying the reaction product to obtain the negative active material.

12 Claims, 13 Drawing Sheets

(51) Int. Cl.

| | |
|---|---|
| *H01M 4/02* | (2006.01) |
| *C04B 35/532* | (2006.01) |
| *C04B 35/634* | (2006.01) |
| *H01M 4/1393* | (2010.01) |
| *H01M 4/38* | (2006.01) |
| *H01M 4/587* | (2010.01) |
| *H01M 10/0525* | (2010.01) |
| *H01M 4/131* | (2010.01) |
| *H01M 4/134* | (2010.01) |
| *H01M 4/1391* | (2010.01) |
| *H01M 4/1395* | (2010.01) |
| *H01M 4/36* | (2006.01) |

(52) U.S. Cl.
CPC .......... *H01M 4/131* (2013.01); *H01M 4/134* (2013.01); *H01M 4/1391* (2013.01); *H01M 4/1393* (2013.01); *H01M 4/1395* (2013.01); *H01M 4/366* (2013.01); *H01M 4/387* (2013.01); *H01M 4/587* (2013.01); *H01M 10/0525* (2013.01); *C04B 2235/3217* (2013.01); *C04B 2235/3241* (2013.01); *C04B 2235/3272* (2013.01); *C04B 2235/3275* (2013.01); *C04B 2235/3279* (2013.01); *C04B 2235/3284* (2013.01); *C04B 2235/3293* (2013.01); *C04B 2235/3409* (2013.01); *C04B 2235/425* (2013.01); *C04B 2235/444* (2013.01); *C04B 2235/448* (2013.01); *Y02E 60/122* (2013.01)

(58) Field of Classification Search
CPC . B82Y 30/00; C04B 35/532; C04B 35/63488; C04B 2235/32; C04B 2235/3241; C04B 2235/3272; C04B 2235/3275; C04B 2235/3284; C04B 2235/3293; C04B 2235/3409; C04B 2235/425; C04B 2235/444; C04B 2235/448; Y02E 60/122
USPC .......... 429/163, 213; 252/503, 506; 977/773
See application file for complete search history.

(56) References Cited

U.S. PATENT DOCUMENTS

| | | | |
|---|---|---|---|
| 7,022,433 B2* | 4/2006 | Umetani et al. | 429/212 |
| 2003/0044684 A1* | 3/2003 | Nanamoto et al. | 429/231.1 |
| 2005/0142446 A1* | 6/2005 | Yamamoto et al. | 429/231.95 |
| 2008/0118841 A1* | 5/2008 | Kim et al. | 429/231.95 |
| 2008/0286656 A1* | 11/2008 | Cho et al. | 429/231.95 |

FOREIGN PATENT DOCUMENTS

| | | | |
|---|---|---|---|
| CN | 101740764 | * | 6/2010 |
| CN | 101740764 A | * | 6/2010 |

OTHER PUBLICATIONS

Machine Translation of Abstract of CN101740764A; 1 page; Jun. 16, 2010; China.
Machine Translation of Abstract CN1194431C; 1 page; 22005-03-23; China.
Machine Translation of Abstract CN100375319C; 1 page; Mar. 12, 2008; China.
Patent Cooperation Treaty; PCT International Search Report Issued in Connection with PCT/CN2011/078496; Sep. 8, 2011; 3 pages; China.

* cited by examiner

NEGATIVE ACTIVE MATERIALS, LITHIUM ION BATTERIES, AND METHODS THEREOF

CROSS REFERENCE TO RELATED APPLICATIONS

This application claims the benefit and priority of Chinese Patent Application No. 201010260247.9, filed on Aug. 19, 2010, the entirety of which is hereby incorporated by reference.

FIELD OF THE DISCLOSURE

The present disclosure generally relates to negative active materials, lithium ion batteries containing the negative active materials, and methods for preparing the same. More particularly, the present disclosure relates to tin-negative-active materials, batteries having a tin-negative-active material, and methods of producing the same.

BACKGROUND

Lithium ion secondary batteries are rechargeable batteries often used to power mobile communication devices and portable electronic devices. Without wishing to be bound by the theory and generally speaking, a lithium ion secondary battery may be charged by providing an external electrical power source that forces, or otherwise moves, lithium ions from a positive electrode to a negative electrode. During discharge, the lithium ions may carry current back from the negative electrode to the positive electrode.

Prior materials used as a negative active material within the negative electrode may include lithium metal, carbon materials such as coal and graphite, and tin ("Sn") materials, as well as complex oxidations of Sn or Sn-based alloys and graphite. Without wishing to be bound by the theory, Applicants believe that Sn negative materials exhibited a relatively higher specific capacity than, for example, some carbon materials, including graphite materials. For example without wishing to be bound by the theory, the theoretic capacity of metal Sn may be about 994 milliampers per gram ("mAh/g"); the theoretic capacity of SnO may be about 600 mAh/g; and the theoretic capacity of $SnO_2$ may be about 777 mAh/g. Further, without wishing to be bound by the theory, Sn may produce about 3 times volume change during the charging and discharging process, which may cause electrode peeling off, powderizing and further cause a drop in capacity and cycling performance.

SUMMARY

In accordance with various illustrative embodiments hereinafter disclosed are methods for preparing negative active materials. One such method may include mixing a carbon material, an organic polymer, and a Sn-containing compound with water to obtain a mixed solution system. A complexing agent may be added to the mixed solution system, optionally under constant stirring to form an intermediate solution. A reducing agent may be added to the intermediate solution to form a reaction product. The reaction product may be optionally filtered, washed, and dried to form a negative active material.

In accordance with various alternative embodiments hereinafter disclosed are negative electrode materials, which may include a binding agent, a conducting agent and a negative active material prepared in accordance with the method of the illustrative embodiment above.

In accordance with still further alternative embodiments hereinafter disclosed are lithium ion batteries. The lithium ion batteries may include a shell; an electrode core housed within the shell; a cover board for sealing the shell; an electrolyte disposed inside the shell; wherein the electrode core may comprise a positive plate, a negative plate and a separator located in between the positive plate and the negative plate; the positive plate may comprise a positive current collector and positive active material coated on the positive current collector; the negative plate may comprise a negative current collector and negative active material coated on the negative current collector; wherein, the negative active material may be prepared in accordance with the method of the illustrative embodiment above.

While negative active materials, lithium-ion batteries, and methods thereof, will be described in connection with various preferred illustrative embodiments, it will be understood that this disclosure is not intended to limit the negative active materials, lithium-ion batteries, and methods thereof to those embodiments. On the contrary, this disclosure is intended to cover all alternatives, modifications, and equivalents as may be included within the spirit and scope of the negative active materials, lithium-ion batteries, and methods as defined by the appended claims. Further, in the interest of brevity, clarification, and without limitation, the numerical ranges provided herein are intended to be inclusive of all alternative ranges. As a non-limiting example, where a weight ratio ranging from "about 0.03 to about 0.2:about 1" is provided, it is intended to disclose all intermediate ratios, including without limitation from about 0.03 to about 0.15: about 1, from about 0.035:about 1; about 0.05 to about 0.1:about 1; etc.

BRIEF DESCRIPTION OF THE DRAWING

Other advantages of the present negative active materials, lithium-ion batteries, and methods thereof will be readily appreciated, by reference to the following description taken in conjunction with the accompanying drawing figures, in which.

DETAILED DESCRIPTION OF THE EMBODIMENTS

Figure 1A:
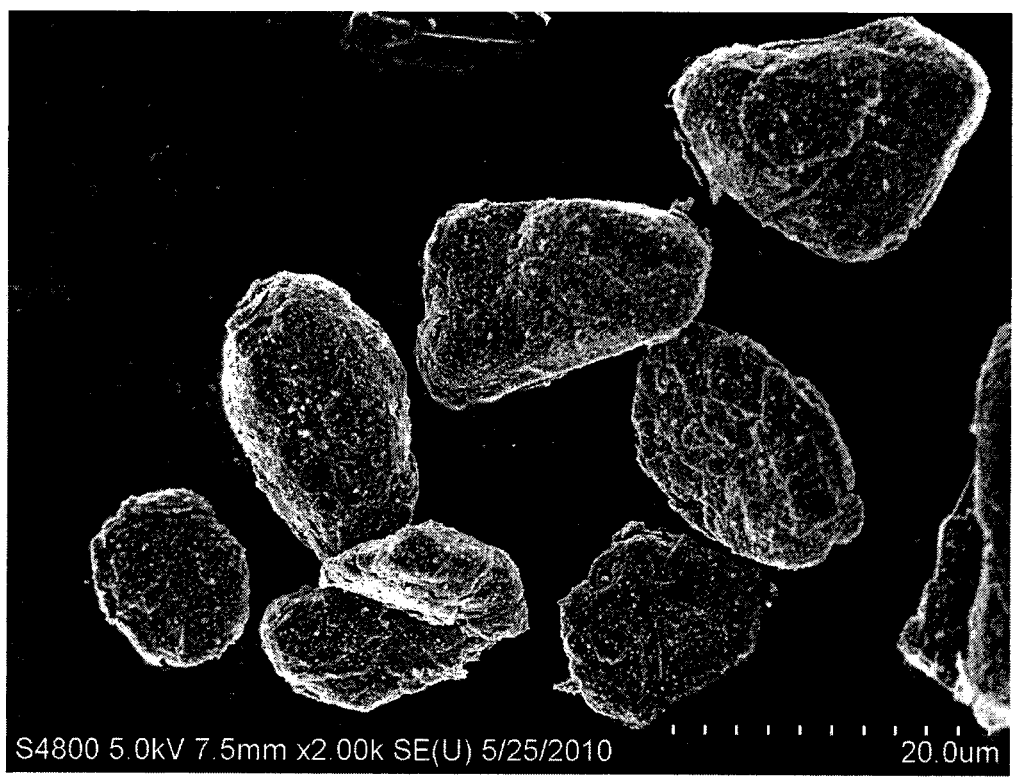
FIG. 1a illustrates a 2000 fold magnification SEM figure of an illustrative negative active material sample A2.

Reference will be made in detail to embodiments of the present negative active materials, lithium-ion batteries, and methods. The embodiments described herein with reference to drawing figures are explanatory, illustrative, and used to generally understand the present negative active materials, lithium-ion batteries, and methods. The embodiments shall not be construed to limit the present negative active materials, lithium-ion batteries, and methods.

According to an aspect of the present disclosure, a method for preparing a negative active material may include, or otherwise comprise, mixing a carbon material, an organic polymer, and a Sn-containing compound with water to obtain a mixed solution system. A complexing agent may be added, or otherwise provided, to the mixed solution system, optionally under constant stirring of the mixed solution to form an intermediate solution. A reducing agent may be added, or otherwise provided, to the intermediate solution to form a reaction product. The reaction product may be optionally filtered, washed, and dried to form a negative active material. In alternative embodiments without limitation, the steps of "adding" various components/compounds utilized within the above-described method, such as without limitation the reducing agent and the complexing agent, may include indirect additions such as adding precursors, which form the components "in situ." In these and other alternative embodiments, the steps of the methods described herein may occur in any particular order and a second or third step may start, or complete, before a first or second step is started or completed.

In an embodiment, the carbon material may be any generally known carbon materials, including without limitation one or more materials selected from the following: natural graphite, artificial graphite, hard carbon, and mesocarbon microbead ("MCMB"). The natural graphite and the artificial graphite may be sphere graphite or sheet graphite.

In an embodiment, the organic polymer(s) may be any generally known organic polymer(s). Without limitation, the organic polymer(s) may be one or more selected from the following: asphalt, polyoxyethylene-polyorxypropylene-polyorxyethylene (POE-POP—POE (P123)), PVDF and PTFE. In an alternative embodiment, the organic polymer(s) may be in a fluid state at temperatures ranging from about room temperature to about 100 degrees Celsius.

In various embodiments, suitable Sn-containing compounds may include any such water-soluble compound that is capable of forming a solution in water. Non-limiting examples of suitable Sn-containing compounds include, without limitation, tin sulfate and tin chloride. In various other embodiments, the term Sn-containing compound may be understood to include metal tin, tin alloy, tin oxidations, and oxidations of tin alloy.

In an embodiment, a method of mixing the carbon material, the organic polymer, the Sn-containing compound, which may optionally be in solution form, may include adding, or otherwise providing, the carbon material or the organic polymer into a solution of the Sn-containing compound. Without wishing to be bound by the theory, Applicants believe that first mixing the carbon material with the organic compound and then adding that mixture into the solution of the Sn-containing compound may yield a more uniformly-mixed mixed solution system.

The carbon material, organic polymer, and Sn-containing compound may be mixed in a wide variety of proportions to form the mixed solution system. In an embodiment, the carbon material, the organic polymer, the Sn-containing compound may have a weight ratio ranging from about 1 to about 4:from about 0.1 to about 0.4:about 1, respectively; and alternatively from about 1.5 to about 3:from about 0.15 to about 0.3:about 1, respectively.

In an embodiment, a complexing agent may be added to the mixed solution system, and in an embodiment may form an intermediate solution. Optionally, the complexing agent may be added while the mixed solution system is being constantly stirred. In a still further alternative embodiment, the complexing agent may be added to the mixed solution system after the mixed solution system is formed. In an embodiment, the complexing agent may be itself in solution form, and may be added to the mixed solution system in drops. The stirring method may be any method provided that the materials in the mixed solution system do not form an appreciable amount of sedimentation.

The complexing agent may be any complexing agent generally known to one of ordinary skill in the art. Without limitation, the complexing agent may be one or more selected from the following: citric acid; tartaric acid; sodium ethylene diamine tetracetate; and sodium succinate. In various embodiments, the dosage of the complexing agent and the Sn-containing compound may have a weight ratios ranging from about 0.8 to about 3:about 1; alternatively from about 0.8 to about 2:about 1.

In an embodiment, a reducing agent may be added to the intermediate solution formed by the combination of the mixed solution system and the complexing agent to form a reaction product. The reducing agent may be any known reducing agent, including without limitation one or more selected reducing agents from the following: sodium borohydride; acetaldehyde; formaldehyde; and sodium hypophosphite. In various embodiments, the dosage of the reducing agent and the Sn-containing compound may have a weight ratio of ranging from about 2.7 to about 6:about 1; alternatively from about 2.7 to about 5:about 1.

Without wishing to be bound by the theory Applicants believes that to make the reducing agent react more fully, during formation of the reaction product, the intermediate solution may be maintained at a temperature ranging from about 70 C to about 90 C for a time ranging from about 120 minutes to about 360 minutes. Following formation of the reaction product, the reaction product may be suction filtered, washed by deionized water, and then dried in vacuum under around a temperature ranging from about 80 C to about 100 C. The suction filtration, washing and vacuum drying methods are generally known.

The reaction product formed by the above-described methods may be a negative active material according to various embodiments of the present disclosure.

In alternative embodiments and without wishing to be bound by the theory, to further improve the performance of the negative active material prepared, the carbon material may be activated, for example via acidization, before it is added to the Sn-containing compound. The acidizing method may be any method known to those of ordinary skill in the art. In an exemplary acidizing method, while stirring, the graphite and the acidizing solution may be mixed and heated to a temperature ranging from about 60 C to about 100 C, and maintained at one or more temperatures ranging from about 60 C to about 100 C for a time ranging from about 2 hours to about 5 hours. In embodiments wherein the carbon material may be graphite, after acidizing the graphite, the other function or functional groups on the surface of the graphite may be removed. Without wishing to be bound by the theory, Applicants believe that processing the graphite in the above-described manner may permit it to be better dispersed in the mixed solution and better combined with the organic polymer(s). The acidizing solution may be any commonly known acid, including without limitation one or more selected from the following: HCl; $H_2SO_4$; and $HNO_3$.

Further without wishing to be bound by the theory, Applicants believe that after formation of the negative active material, in accordance with the methods herein described, the negative active material may be sintered in a vacuum, or a protective atmosphere, which may further enhance the capacity and the cycling performance of the negative active material. Without limitation, the sintering may be at a temperature ranging from about 300 C to about 900 C. Suitable vacuum, or protective atmospheric, conditions may include environments wherein the absolute pressure is under about $10^{-5}$ Pa. Protective atmosphere may include any inert gas (including without limitation helium, neon, argon, krypton, xenon) or nitrogen atmospheres.

In an embodiment, the negative active materials may be further processed after the sintering treatment, as described herein, to carbonize the organic polymers by the addition of carbon having a plurality of millipores. Without wishing to be bound by the theory, Applicants believe that the Sn may react with the carbon and may be closely attached around the graphite. Further without wishing to be bound by the theory, Applicants believe that after the sintering treatment, the organic polymers may be carbonized and/or otherwise produce carbon material having a plurality of millipores.

In some embodiments, a first water-soluble aiding compound may be added to the mixed solution. The first water-soluble aiding compound may be added to the mixed solution before, after, or during addition of the Sn-containing compound. Suitable first water soluble aiding compounds may be one or more soluble salts selected from the group consisting of: Ag, Zn, Al, Sb, and nitrates thereof.

In an embodiment, the weight ratio of the first aiding compound to the Sn-containing compound may range from about 0.03 to about 0.2:about 1; alternatively from about 0.05 to about 0.1:about 1. Without wishing to be bound by the theory Applicants believe that inclusion of the first aiding compound with the Sn-containing compound may enhance the capacity of the negative active material, and relive the swell of the negative material during charging and discharging such that the battery cycling performance may be enhanced.

In an alternative embodiment, a second water-soluble aiding compound may be added, or introduced, to the mixed solution system. The second water-soluble aiding compound may be added to the mixed solution before, after, or during addition of the Sn-containing compound. The second water-soluble aiding compound may include one or more an aiding elements selected from the group consisting of: Co, Ni, Cu, Cr, and Fe. In an embodiment, the weight ratio of the second water soluble adding compound and the Sn-containing compound may range from about 0.04 to about 0.2:about 1; alternatively from about 0.05 to about 0.1:about 1.

In embodiments wherein the first aiding compound, or the first aiding compound and the second aiding compounds, are added, there may or may not be a sintering step after formation of the reaction product. Without wishing to be bound by the theory Applicants believe that during sintering Sn may form alloy particles with the first aiding compound and/or the second aiding compound, and the aiding elements may enter into the crystal lattices of each other, partially or completely, which may beneficially relieve the volume increase of Sn during charging and discharging and further enhancing the cycling performance of the material.

In an alternative embodiment, a method of preparing a negative active material may include the following steps: (a') while stirring, mixing a graphite with one of hydrochloric acid, sulphuric acid and nitric acid and heating to the mixture to a temperature ranging from about 60 to about 100 C for a time ranging from about 2 hours to about 5 hours; (b') filtering and then drying the mixture of step (a') to obtain a treated graphite; (c') mixing the treated graphite with an organic polymer to form a second mixture; (d') adding the second mixture of step (c') into a mixed solution comprising a Sn-containing compound, a first water soluble aiding compound and a second water aiding soluble compound to obtain a mixed solution system; (e') adding a complexing agent into the mixed solution system to form an intermediate solution; (f') adding a reducing agent at a temperature of the intermediate solution ranging from about 70 C to about 90 C into the intermediate solution to form a reaction product; (g') suction filtering the reaction product and washing the filtered reaction product with de-ionized water, vacuum drying the washed and filtered reaction product under a temperature ranging from about 80 C to about 100 C; and (h') sintering the reaction product in a vacuum, or protection atmosphere, at a temperature of the reaction product ranging from about 300 C to about 900 C.

Without limitation, in various embodiments the graphite surface of the negative active materials may be distributed with Sn-containing particles. In an embodiment, the distributed Sn-containing particles may have a bulk-average diameter ranging about 20 nanometers ("nm") to about 200 nm; alternatively from about 20 nm to about 100. In various embodiments, such as without limitation in embodiments without a sintering step, the Sn-containing particle may be metal Sn. In an embodiment, wherein the mixed solution system comprises a first or a second aiding compound, the graphite surface may be distributed with a first aiding element or a second aiding element. In the case that a sintering step is carried out after step C, the above mentioned Sn-containing particles may comprise one or more selected from metal Sn, Sn alloy, Sn oxidations, or oxidations of Sn alloy.

Without wishing to be bound by the theory Applicants believe that addition of both the first aiding compound and the second aiding compound to the mixed solution system may enhance the capacity and cycling performance of the negative active material. Further without wishing to be bound by the theory Applicants believe that the enhancement may be furthered by sintering, if the Sn-containing particles comprise Sn alloy oxidations having a formula of $SnO_x$-$M_1O_y$-$M_2O_z$, in which $0<x\leq3$; $0<y\leq3$; $0<z\leq3$, wherein $M_1$ is one or more first metals selected from the group consisting of: Ag, Zn, Sb and Al, wherein $M_2$ is one or more second metals selected from group consisting of: Co, Ni, Cu, Fe, Cr, P, Be, and Si. Still further and without wishing to be bound by the theory Applicants believe that addition of $M_1$ metal may enhance the capacity of the material with Sn and relieve the volume increase of Sn during charging and discharging, and addition of $M_2$ aiding may further relieve the volume increase during charging and discharging. Applicants further believe, without limitation, that addition of $M_1$ or $M_2$ enhances the cycling performance. In a non-limiting embodiment, the aforementioned Sn alloy oxidations may be formed in situ by adding the first and/or the second aiding compound(s) into the mixed solution system and sintering the reaction product, which may be produced in the solution system and then optionally filtered from the solution.

According to another aspect of the present disclosure, a negative electrode material is provided. The negative electrode material may include: a negative active material (prepared in accordance with the disclosure herein), a binding agent, and a conductive agent. The negative electrode may be formed by mixing the negative active material (prepared in accordance with the disclosure herein), the binding agent, and the conductive agent.

In the negative electrode material, the binding agent may be any known suitable material, including without limitation one or more binding agents selected from the following: sodium carboxymethyl cellulose, polyvinylidene fluoride, polyfluortetraethylene, polyethylene, polypropylene, ethylene-propylene-diolefin monomer, sulfonated ethylene-propylene-dinene monomer, styrene/butadiene rubber and fluorubber. Optionally, the binding agent may be a complex binding agent of styrene/butadiene rubber with sodium carboxymethyl cellulose.

The weight ratio of the negative active material and the binding agent may be generally varied, and without limitation may range from about 5 to about 50:about 1; alternatively from about 10 to about 35:about 1. In an embodiment wherein binding agent is a complex binding agent of styrene/butadiene rubber and sodium carboxymethyl cellulose, the weight ratio of negative active material to complex binding agent may range from about 0.5 to about 4:about 1.

According to still another aspect of the present disclosure and as an application of the negative electrode material, a lithium ion battery may be provided. The lithium ion battery may include: a shell; an electrode core housed in the shell; a cover board for sealing the shell; an electrolyte disposed inside the shell; wherein the electrode core may comprise a positive plate, a negative plate and a separator located in between the positive plate and the negative plate, the positive plate may comprise a positive current collector and a positive electrode material coated on the positive current collector, the negative plate may comprise a negative current collector and a negative electrode material coated on the negative current collector, wherein, the negative electrode material is the material prepared according to the methods disclosed herein.

Preparation methods of lithium ion batteries are generally known. For example and without limitation, the positive active material, the negative active material each may be mixed with the conductive agent and the binding agent in the solvent in certain ratio to form a positive slurry and a negative slurry, then the slurry may be coated onto a wide current collector which may further be dried, rolled and sliced into electrode plates.

The drying and rolling conditions are generally known, and may include without limitation a drying temperature of the negative electrode plate ranging from about 60 C to about 120 C, alternatively from about 80 C to about 110 C, and the drying time may range from about 0.5 hours to about 5 hours.

Suitable electrode core structures are generally known, and may include without limitation a coiled or an overlapped core.

Suitable positive electrode material are generally known. The positive electrode material may comprise a positive active material, a binding agent and a conductive agent. The positive active material may be any positive materials that are commercially available, including without limitation $LiFePO_4$, $Li_3V_2(PO_4)_3$, $LiMn_2O_4$, $LiMnO_2$, $LiNiO_2$, $LiCoO_2$, $LiVPO_4F$, $LiFeO_2$, etc. Ternary system materials $Li_{1+x}L_{1-y-z}M_yN_zO_2$ may also be adopted, wherein $-0.1\leq x\leq 0.2$, $0\leq y\leq 1$, $0\leq z\leq 1$, $0\leq y+z\leq 1.0$, and wherein L, M, N may be one or more metals selected from the following: Co, Mn, Ni, Al, Mg, Ga and 3d transition metal elements. The binding agent may be any generally known binding agent, including for example one or more agents selected from the following: PVDF, PTFE or styrene butadiene rubber. The amount of the binding agent may range from about 0.1 to about 15 wt % based on the total weight of the positive electrode; alternatively from about 1 to about 7 wt %. The conductive agent may be any generally known conductive agent, including for example one or more conductive agents selected from the following: graphite, carbon fiber, carbon black, metal powder and fiber. The amount of the conductive agent may range from about 0.1 to about 20 wt %, based on the total weight of the positive active material; alternatively from about 2 to about 10 wt %, based on the total weight of the positive active material.

Preparation methods of the positive electrode are generally known. For example, the positive active material, the binding agent and the conductive material may be firstly solved to form a positive slurry, the dosage of the solvent is generally known and may be adjusted according to the required viscosity. Then, the positive slurry may be coated onto the positive current collector and dried pressed and sliced into positive electrode plates. The drying temperature may be about 120 C and the drying time may be about 5 hours. The solvent for the positive slurry may be any generally known solvent, for example it may be one or more solvents selected from the following: NMP, DMF, DEF, DMSO, THF, water and alcohols. The amount of the solvent may any amount provided that the slurry can be coated onto the current collector. Optionally, the positive active material in the slurry has a weight ratio ranging from about 40 to about 90%, alternatively from about 50 to about 85%.

The separator in the battery may be insulated and may hold fluids. The separator may be any known lithium ion battery separator, for example polyolefin microporous film, polyethylene felt, glass fiber felt or super fine glass fiber paper, and the like.

The electrolyte of the battery may be any non-aqueous electrolyte. The non-aqueous electrolyte may be a solution formed by solving an electrolyte lithium salt into a non-aqueous solvent, as is generally known. For example and without limitation, the electrolyte lithium salt may be one or more selected from following: $LiPF_6$, $LiClO_4$, $LiBF_4$, $LiAsF_6$, $LiSiF_6$, $LiB(C_6H_5)_4$, LiCl, LiBr, $LiAlCl_4$, $LiC(SO_2CF_3)_3$, $LiCH_3SO_3$ and $LiN(SO_2CF_3)_2$. The non aqueous solution may be a mixed solution of chain acid esters and ring acid esters. The chain acid ester may be one or more selected from the following: Dimethyl carbonate (DMC), Diethyl carbonate (DEC), Ethyl methyl carbonate (EMC), Methyl propyl carbonate (MPC), Dipropyl carbonate (DPC) and other fluorin or sulphur containing chain organic esters with unsaturated bond. The ring acid ester may be one or more selected from the following; Ethylene carbonate (EC), Propene carbonate (PC), Vinylene carbonate (VC), γ-BL (butyrolactone), sultone and other other fluorin or sulphur containing ring organic esters with unsaturated bond. In the non-aqueous electrolyte, the concentration of the lithium salt may range from about 0.1 to about 2 mol/L; alternatively from about 0.8 to about 1.2 mol/L.

Preparation methods of the battery are generally known. In an embodiment, the electrode core may be firstly disposed in the shell, and then the electrolyte may be added into the shell. Thereafter, the shell may be sealed to form a battery. The sealing method and the amount of the electrolyte are generally known.

The present disclosure will further be described in details with below examples.

EXAMPLE 1

50 g total of graphite and organic polymer polyoxyethylene-polyorxypropylene-polyorxyethylene (POE-POP—POE) P123 were mixed to form a mixture in the weight ratio of about 10:1; meanwhile 21.5 g $SnCl_4$ was solved in water to form a 400 ml solution and the solution was then added into the above mixture for stirring and mixing, the mixed solution was added into a volumetric flask which was then placed into a water bath and heated to 85 C, 20.5 g citric acid was added into de-ionized water to form a 250 ml solution and then the solution was slowly added into the volumetric flask in drops; 60 g sodium borohydride was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours to obtain a sample A1.

EXAMPLE 2

50 g graphite and 500 g $H_2SO_4$ acid with a concentration of 98% were mixed, the mixture was heated to 85 C and stirred for 3 hours; the solution was then filtered and washed and then dried under 60 C for 12 hours to obtain acidized graphite. The acidized graphite was then mixed with the organic polymer P123 in a weight ratio of about 10:1, meanwhile 21.5 g $SnCl_4$ was solved in water to form a 400 ml solution and the solution was then added into the mixture of P123 and acidized graphite for stirring and mixing, the mixed solution was added into a volumetric flask which was then placed into a water bath and heated to 85 C; 28 g citric acid was added into de-ionized water to form a 250 ml solution and then the solution was slowly added into the volumetric flask in drops; 60 g sodium borohydride was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours to obtain a sample A2.

EXAMPLE 3

The negative active material was prepared according to Example 2, and then sintered under 300 C in Argon gas protection for 10 hours to prepare a sample B1.

EXAMPLE 4

The negative active material was prepared according to Example 2, and then sintered under 600 C in Argon gas protection for 10 hours to prepare a sample C1.

EXAMPLE 5

The negative active material was prepared according to Example 2, and then sintered under 900 C in Argon gas protection for 10 hours to prepare a sample D1.

EXAMPLE 6

50 g graphite and 500 g HCl acid with a concentration of 34% were mixed, the mixture was heated to 85 C and stirred for 3 hours; the solution was then filtered and washed and then dried under 60 C for 12 hours to obtain acidized graphite. The acidized graphite was then mixed with the organic polymer PVDF in a weight ratio of about 10:1, meanwhile 21.5 g $SnSO_4$ was solved in water to form a 400 ml solution and the solution was then added into the mixture of PVDF and acidized graphite for stirring and mixing, the mixed solution was added into a volumetric flask which was then placed into a water bath and heated to 85 C; 35 g citric acid was added into de-ionized water to form a 250 ml solution and then the solution was slowly added into the volumetric flask in drops; 60 g sodium borohydride was added into de-ionized water to form a 250 ml solution and then the solution was slowly added into the volumetric flask in drops; the solution in the flask was then stirred for 2 hours under 85□, the reacted solution in the flask was filtered and dried, the filtered product was then dried in a vacuum under 80 C for 12 hours, and then the product was sintered under 600 C in vacuum for 10 hours to obtain a sample C2.

EXAMPLE 7

50 g graphite and 500 g $HNO_3$ acid with a concentration of 68% were mixed, the mixture was heated to 85 C and stirred for 3 hours; the solution was then filtered and washed and then dried under 60 C for 12 hours to obtain acidized graphite. The acidized graphite was then mixed with the organic polymer asphalte in a weight ratio of about 10:1, meanwhile 18 g $SnSO_4$, 1 g $ZnSO_4$ and 1.5 g $CoSO_4$ were solved in water to form a 400 ml solution and the solution was then added into the mixture of asphalte and acidized graphite for stirring and mixing, the mixed solution was added into a volumetric flask which was then placed into a water bath and heated to 85 C, 20.5 g EDTA was added into de-ionized water to form a 250 ml solution and then the solution was slowly added into the volumetric flask in drops; 70 g acetaldehyde was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours, and then the product was sintered under 600 C in vacuum for 10 hours to obtain a sample C3.

EXAMPLE 8

50 g graphite and 500 g $HNO_3$ acid with a concentration of 68% were mixed, the mixture was heated to 85 C and stirred for 3 hours; the solution was then filtered and washed and then dried under 60 C for 12 hours to obtain acidized graphite. The acidized graphite was then mixed with the organic polymer asphalte in a weight ratio of about 10:1, meanwhile 18 g $SnSO_4$, 1 g $ZnSO_4$ and 1.5 g $NiSO_4$ were solved in water to form a 400 ml solution and the solution was then added into the mixture of asphalte and acidized graphite for stirring and mixing, the mixed solution was added into a volumetric flask which was then placed into a water bath and heated to 85 C, 20.5 g EDTA was added into de-ionized water to form a 250 ml solution and then the solution was slowly added into the volumetric flask in drops; 70 g acetaldehyde was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours, and then the product was sintered under 600 C in vacuum for 10 hours to obtain a sample C4.

EXAMPLE 9

50 g graphite and 500 g $HNO_3$ acid with a concentration of 68% were mixed, the mixture was heated to 85 C and stirred for 3 hours; the solution was then filtered and washed and then dried under 60 C for 12 hours to obtain acidized graphite. The acidized graphite was then mixed with the organic polymer asphalte in a weight ratio of about 10:1, meanwhile 18 g $SnSO_4$, 1 g $Al_2(SO_4)_3$ and 1.5 g $FeSO_4$ were solved in water to form a 400 ml solution and the solution was then added into the mixture of asphalte and acidized graphite for stirring and mixing, the mixed solution was added into a volumetric flask which was then placed into a water bath and heated to 85 C, 20.5 g sodium succinate was added into de-ionized water to form a 250 ml solution and then the solution was slowly added into the volumetric flask in drops; 82 g sodium hypophosphite was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours, and then the product was sintered under 600 C in vacuum for 10 hours to obtain a sample C5.

EXAMPLE 10

50 g graphite and 500 g $HNO_3$ acid with a concentration of 68% were mixed, the mixture was heated to 85 C and stirred for 3 hours; the solution was then filtered and washed and then dried under 60 C for 12 hours to obtain acidized graphite. The acidized graphite was then mixed with the organic polymer polytetrafluoroethylene in a weight ratio of about 10:1, meanwhile 18 g $SnSO_4$, 1 g $Al_2(SO_4)_3$ and 1.5 g $Cr_2(SO_4)_3$ were solved in water to form a 400 ml solution and the solution was then added into the mixture of polytetrafluoroethylene and acidized graphite for stirring and mixing, the mixed solution was added into a volumetric flask which was then placed into a water bath and heated to 85 C, 20.5 g sodium succinate was added into de-ionized water to form a 250 ml solution and then the solution was slowly added into the volumetric flask in drops; 82 g sodium hypophosphite was added into de-ionized water to form a 250 ml solution and then the solution was slowly added into the volumetric flask in drops; the solution in the flask was then stirred for 2 hours under 85 C, the reacted solution in the flask was filtered and dried, the filtered product was then dried in a vacuum under 80 C for 12 hours, and then the product was sintered under 600 C in vacuum for 10 hours to obtain a sample C6.

EXAMPLE 11

The preparation of the positive electrode plate: LiCoO2, acetylene black and PVDF in a weight ratio of about 100:7:4.5 were solved in NMP and stirred to form a slurry, the slurry was coated onto an aluminum foil and then heated to about 90±5 C to be dried, the foil was then rolled and then sliced into positive electrode plates.

The preparation of the negative plate: A1, styrene/butadiene and sodium carboxymethyl cellulose in a weight ratio of about 100:3:2 were mixed uniformly and then coated onto a plate and then pressed, the electrode plate was then dried under 120 C in vacuum for above 24 hours.

The above prepared positive electrode plate, the negative electrode plate and a PP separator of a thickness of 25 μm were winded toward one direction to form a prismatic lithium ion electrode core and then placed into a shell, an electrolyte of 1.0 mol/L $LiPF_6$/(EC+DEC+DMF) (EC, DEC, DMF has a weight ratio of about 1:1:1) was then added into the shell and the shell was sealed to form a prismatic battery S1 having a thickness of about 5 mm, a width of about 34 mm and a height of about 50 mm.

EXAMPLES 12-20

The preparation method of the lithium ion battery were the same as example 11, the difference was that, A2, B1, C1-C6, D1 replaced A1 and the battery sample prepared were respectively marked as S2, S3, S4-S9, S10.

Control 1

The preparation method of the lithium ion battery was the same as the example 11, the difference was that untreated graphite replaced A1, and battery obtained was marked as DBS1.

Performance Test and Characterization.

Electron Microscope

SEM was used to test sample A2, B1, C1.

Figure 1B:
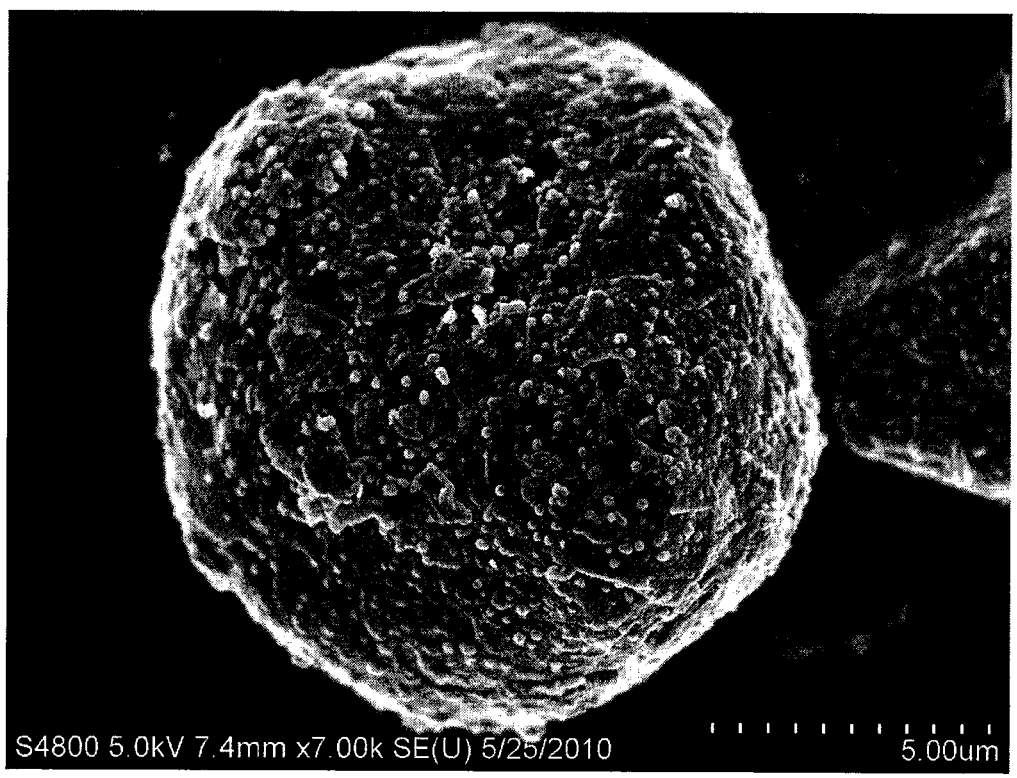
FIG. 1b illustrates a 7000 fold magnification SEM figure of the illustrative negative active material sample A2.
Figure 1C:
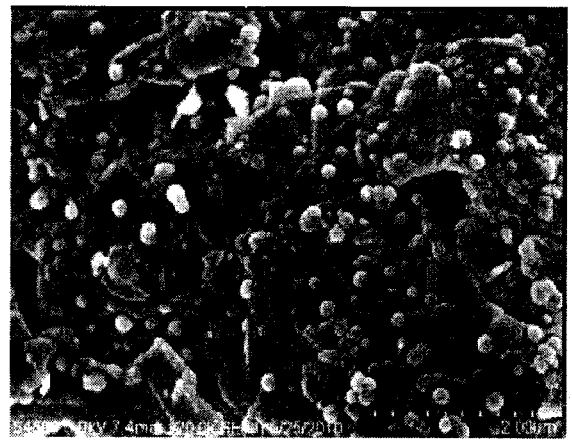
FIG. 1c illustrates a 20000 fold magnification SEM figure of the illustrative negative active material sample A2.
Figure 2A:
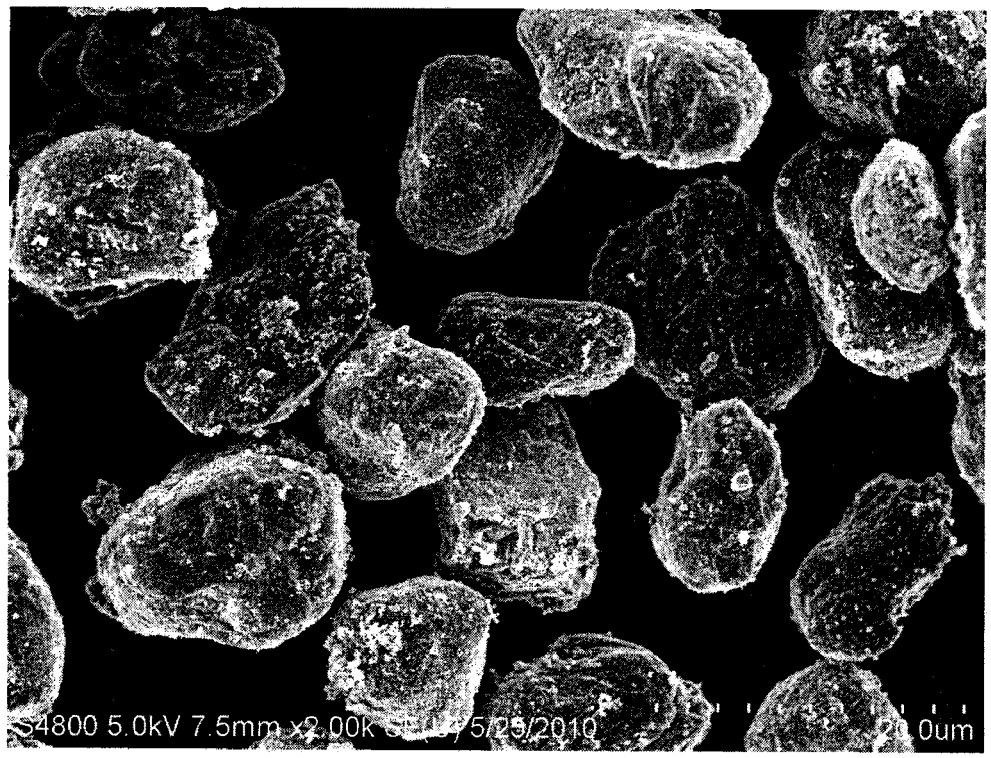
FIG. 2a illustrates a 2000 fold magnification SEM figure of an alternative illustrative negative active material sample B1.
Figure 2B:
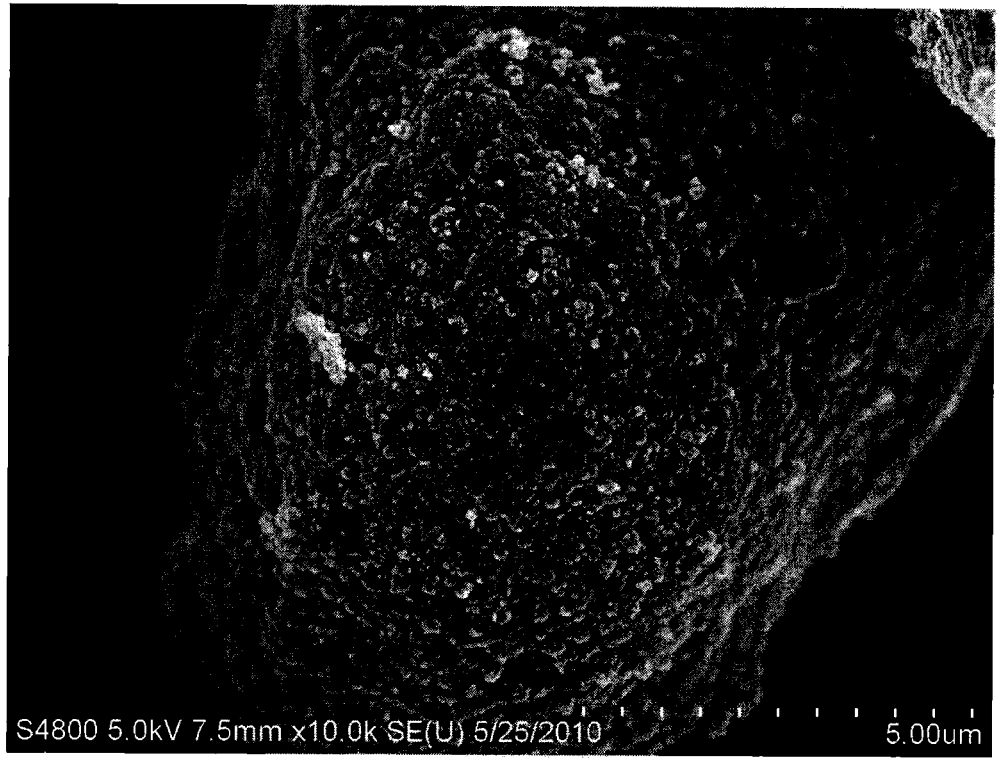
FIG. 2b illustrates a 10000 fold magnification SEM figure of the alternative illustrative negative active material sample B1.
Figure 2C:
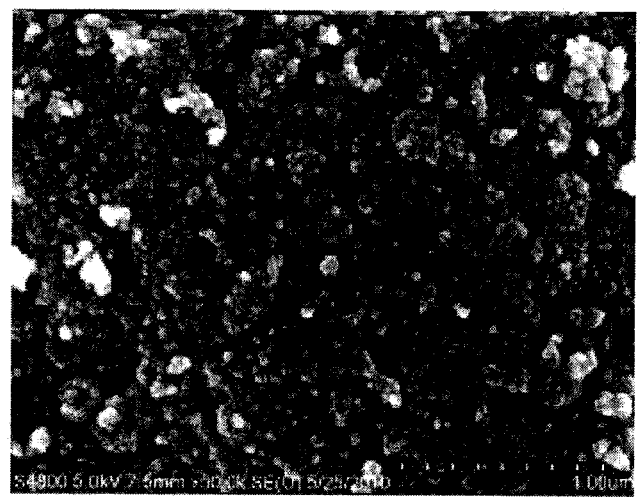
FIG. 2c illustrates a 50000 fold magnification SEM figure of the alternative illustrative negative active material sample B1.
Figure 3A:
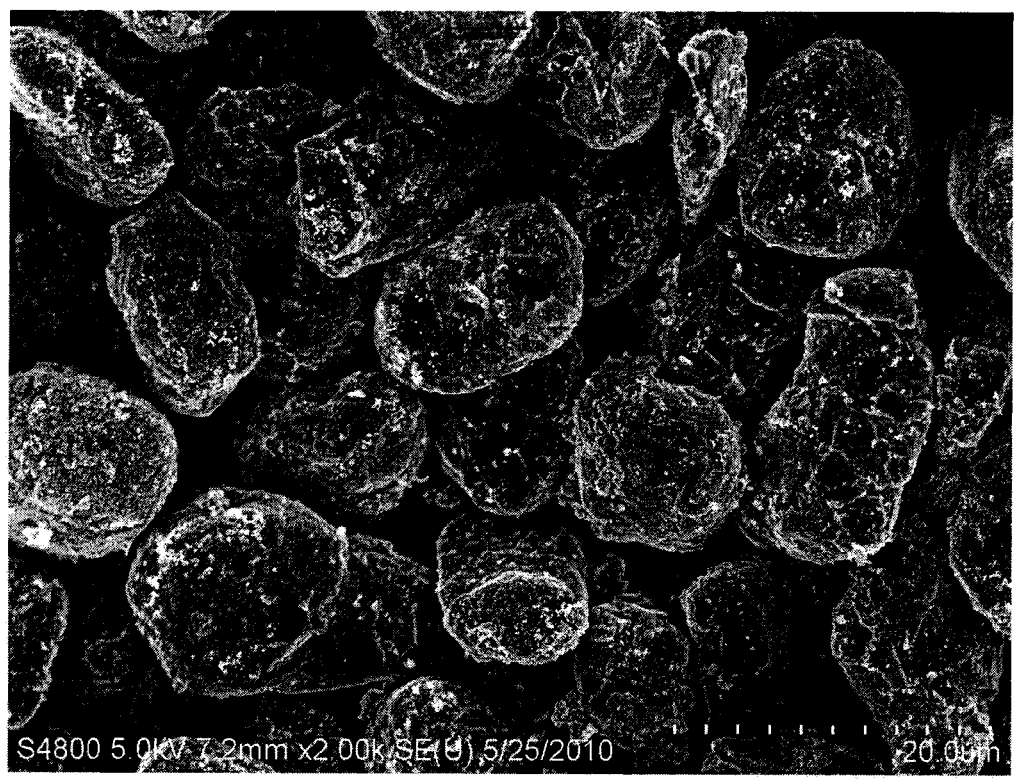
FIG. 3a illustrates a 2000 fold magnification SEM figure of a still further alternative illustrative negative active material sample C1.
Figure 3B:
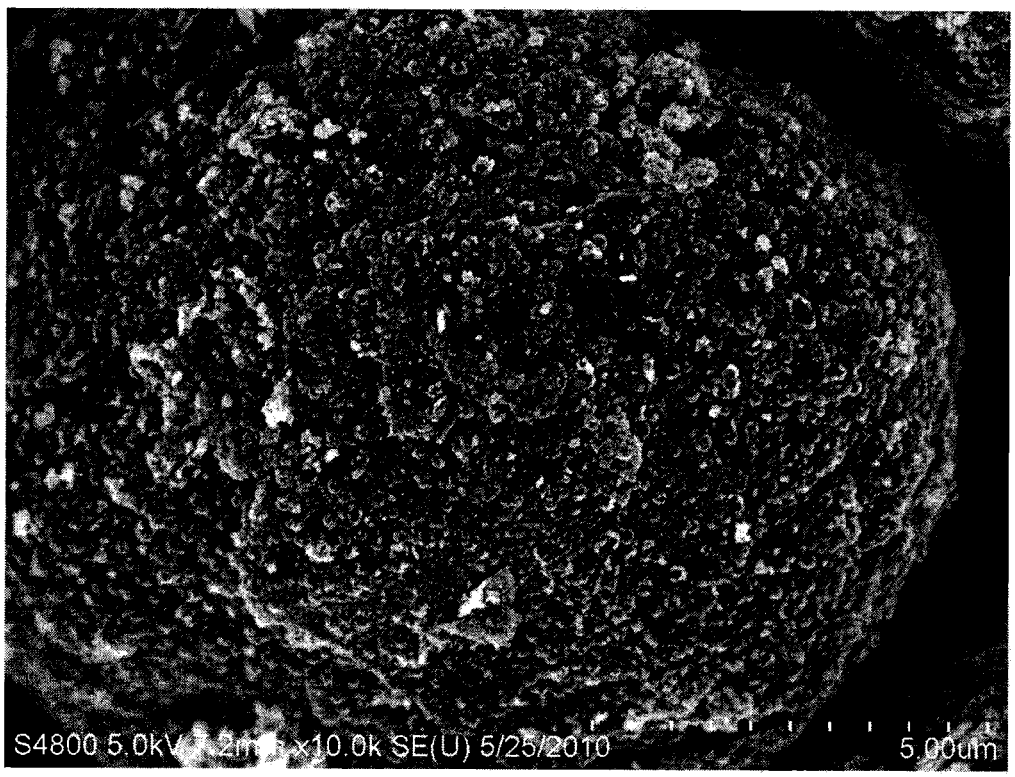
FIG. 3b illustrates a 10000 fold magnification SEM figure of the still further alternative illustrative negative active material sample C1.
Figure 3C:
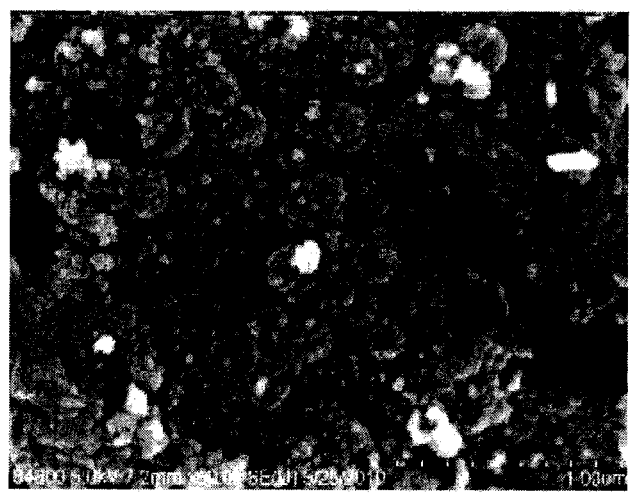
FIG. 3c illustrates a 50000 fold magnification SEM figure of the still further alternative illustrative negative active material sample C1.

SEM views of A2 are illustrated under different magnifications in the following figures: FIG. 1A (2000 times magnified), FIG. 1B (7000 times magnified), and FIG. 1C (20000 times magnified). SEM views of B1 are illustrated under different magnifications in the following figures: FIG. 2A (2000 times magnified), FIG. 2B (10000 times magnified), and FIG. 2C (50000 times magnified). SEM view of C1 are illustrated under different magnifications in the following figures: FIG. 3A (2000 times magnified), FIG. 3B (10000 times magnified), FIG. 3C (50000 times magnified). Without wishing to be bound by the theory Applicants believe that the figures illustrate that: in sample A2, the Sn-containing particles are uniformly coated around the spherical graphite, and the particle size was nanometer grade; after 300 C treatment (sample B1), 600 C treatment (sample C1), along with the increase of the temperature, the Sn and the compound on the surface of the graphite may possibly be melted and absorbed, crystallized, carbonized or reduced etc.; and Sn may be more closely coated around the surface of the graphite, meanwhile, high temperature sintering may form plenty of millipores on the surface of the material and may be more beneficial for lithium ion intercalation and de-intercalation.

Granularity Analysis

Figure 4:
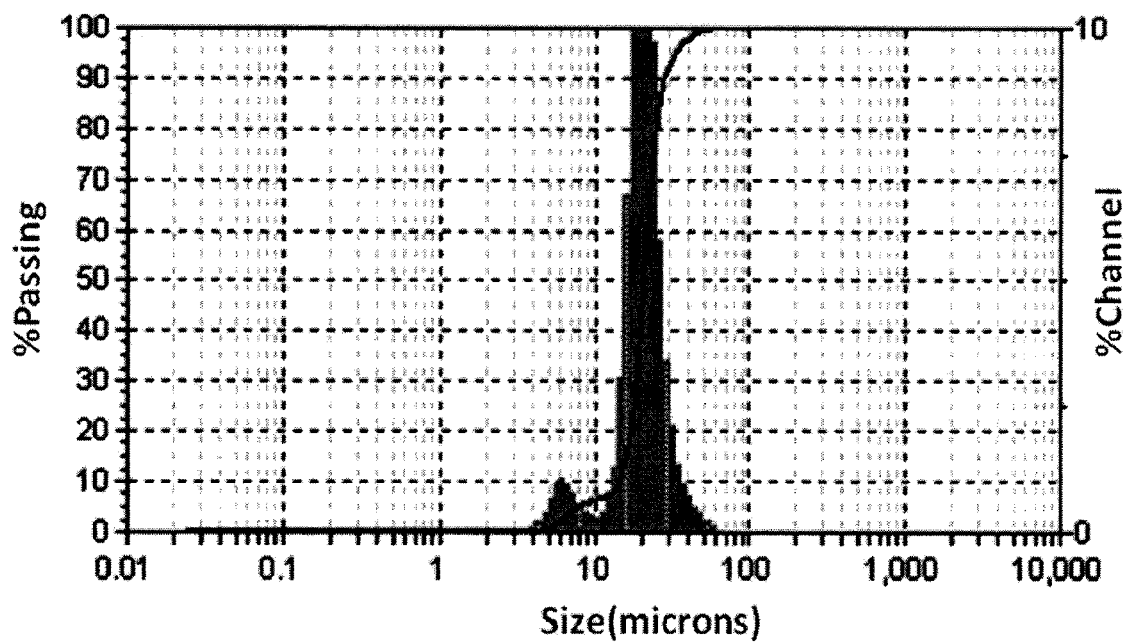
FIG. 4 illustrates a granule size distribution diagram of the illustrative negative active material A2.
Figure 5:
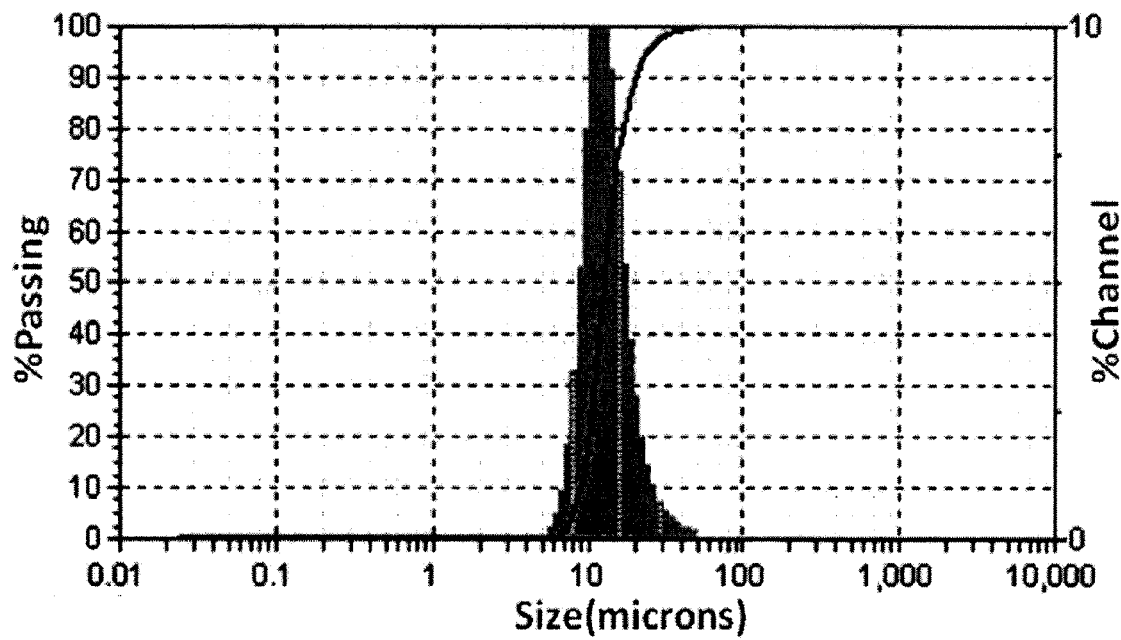
FIG. 5 illustrates a granule size distribution diagram of the still further alternative illustrative negative active material C1.
Figure 6:
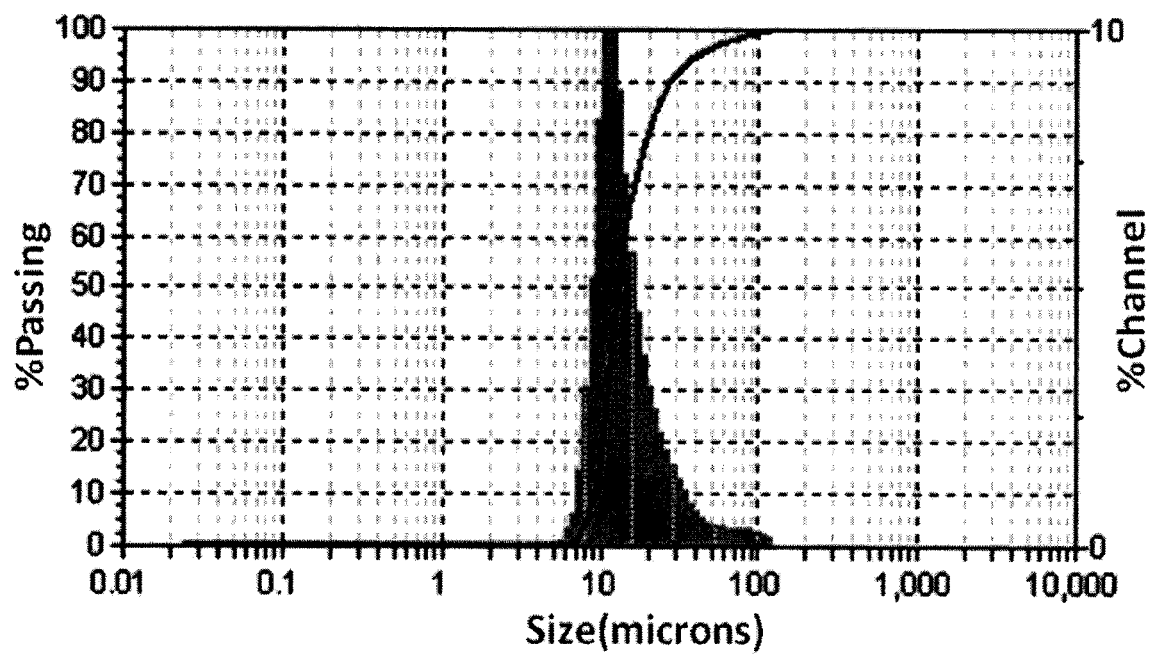
FIG. 6 illustrates a granule size distribution diagram of a second alternative illustrative negative active material D1.

A2, C1 (600 C sintered) and D1 (900 C sintered) were analyzed and respectively formed an A2 granularity distribution as illustrated in FIG. 4, a C1 granularity distribution as illustrated in FIG. 5 and a D1 granularity distribution as illustrated in FIG. 6.

Without wishing to be bound by the theory Applicants believe that the figures illustrate that the granule size decreased after sintering, and the distribution was uniform, which may explain, from the macroscopic point of view, that the Sn was coated around the graphite.

Specific Surface Area Test The graphite, acidized graphite sample A2, and the 300 C, 600 C, 900 C sintered samples B1, C1, D1, were tested.

The result are illustrated in table 1. Without wishing to be bound by the theory Applicants believe that the graphite after acidizing had an increased specific surface area; and after coating with Sn, the specific surface area was decreased almost to its half; along with the increasing of the sintering temperature, the Sn and the compound on the surface of the graphite particle went through certain reactions and the specific surface area started to increase; however, when the sintering temperature is too high and the specific surface area is too large, the performance of the material may also be influenced. Further, without wishing to be bound by the theory Applicants believe that the composing of the Sn around the graphite may vary along the sintering temperature and therefore it is able to control the composition and amount of the coating on the graphite and the specific capacity is able to be controlled.

TABLE 1

| Sample | Test tube weight | Total weight | Sample weight | Testing result |
|---|---|---|---|---|
| Graphite (PDT) | 9.1719 g | 9.6085 g | 0.4366 g | 8.45 m2/g |
| Acidized graphite | 9.4238 g | 9.8563 g | 0.4325 g | 9.04 m2/g |
| A2 | 8.9848 g | 9.2734 g | 0.2744 g | 4.00 m2/g |
| B1 | 8.9093 g | 9.3209 g | 0.4197 g | 5.28 m2/g |
| C1 | 8.6331 g | 8.9075 g | 0.2886 g | 6.47 m2/g |
| D1 | 7.7992 g | 7.9793 g | 0.1801 g | 11.39 m2/g |

Electron Spectrum Test

A2 was analyzed by EDS, the testing was performed on a SEM spectrometer.

Figure 7:
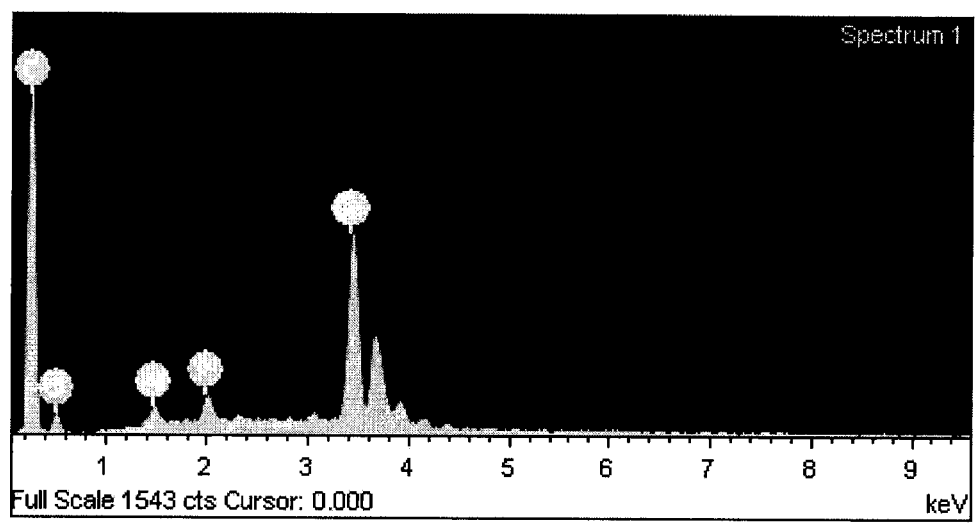
FIG. 7 illustrates an EDS figure of the illustrative negative active material A2.

Without wishing to be bound by the theory Applicants believe that FIG. 7 illustrates three main characteristic peaks of C, Sn, 0, and that Sn was coated around the graphite, and the other weak peaks are caused by the other impurities in the reaction process.

X-Ray Diffraction Analysis

Figure 8:
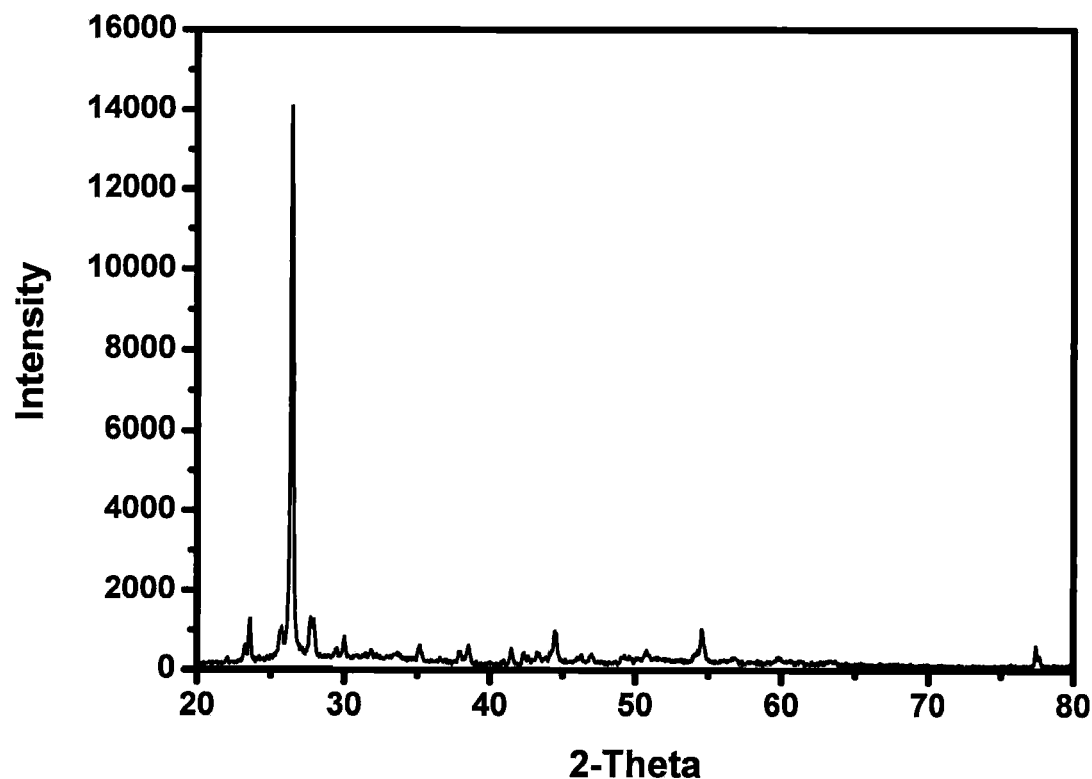
FIG. 8 illustrates an XRD figure of the illustrative negative active material A2.
Figure 9:
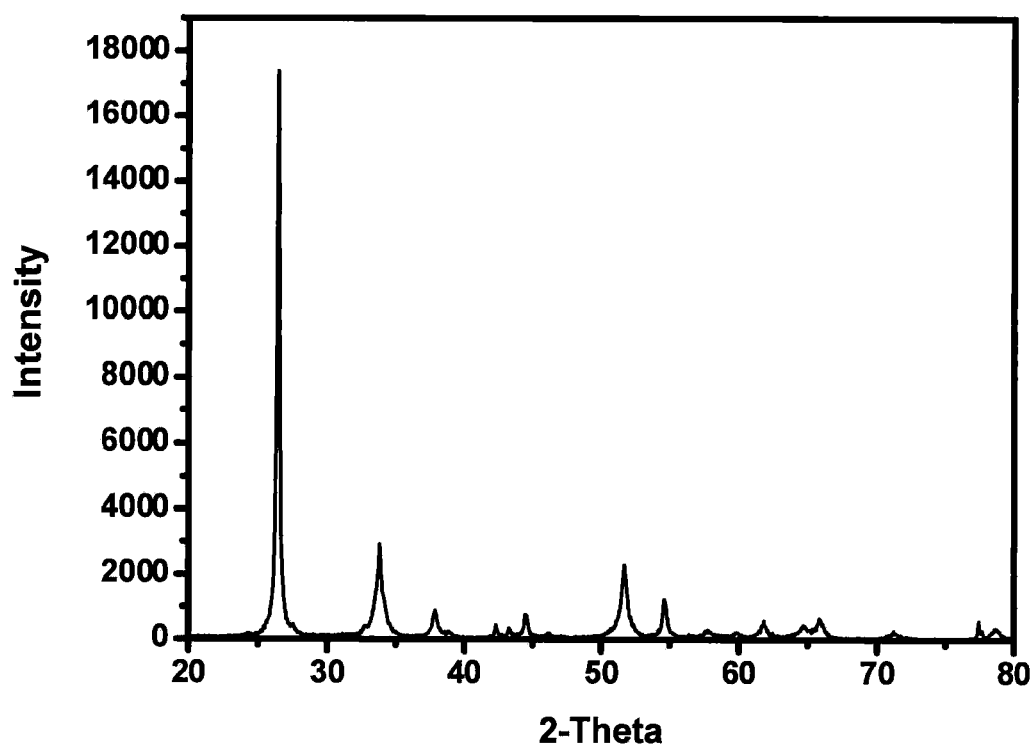
FIG. 9 illustrates an XRD figure of the still further alternative illustrative negative active material C1.
Figure 10:
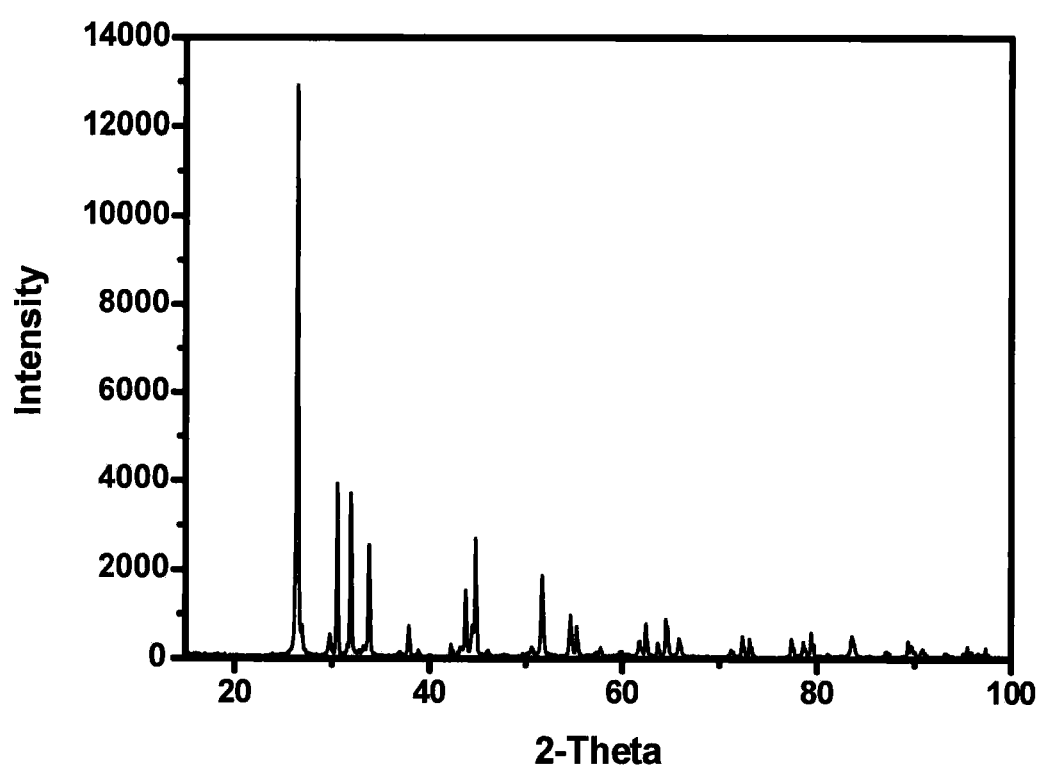
FIG. 10 illustrates an XRD figure of the second alternative illustrative negative active material D1.

D/MAX-PC2200 X-ray diffractometer (Cu target, λ=0.15405 nm) from Rigaku cooperation was used to analyze the phase crystalline structure of A2 and 600 C sintered sample C1, 900 C sintered sample D1, and corresponding diffraction patterns are illustrated in FIG. 8, FIG. 9, and FIG. 10.

Without wishing to be bound by the theory Applicants believe that the figures illustrate that the surface of C1 comprises $SnO_2$, when the temperature is increased to 900 C, further reactions occurred, and SnO and Sn are formed.

Battery Cycling Performance Test

Battery Sample S1-S10 and DBS1 were tested as follows:

Charging and discharging specific capacity of the negative active material:

the battery was set in a discharging state and the discharging current density was about 0.2 mA/cm$^2$, the discharging stop voltage was about 0.5 mV, while the discharging was over, the initial discharging specific capacity was calculated as below according to equation (1):

initial discharging specific capacity(mAh/g)=discharging capacity/weight of the active material    (1)

After the initial discharge, the battery was set in charging state, and the charging current density was about 0.2 mA/cm$^2$, and the charging stop voltage was about 2.5V. After charging was done, the initial charging specific capacity was calculated according to equation (2) below:

initial charging specific capacity(mAh/g)=charging capacity/weight of the active material    (2).

Cycling Performance:

0.3 mA constant current was used to charge the battery, and the charging stop voltage was 2.5V. While the voltage was increased to 2.5V, constant voltage was adopted to charge the battery, then the battery started to discharge at 0.3 mA, the discharging stop voltage was about 0.004V. The above steps were repeated and continuous charging and discharging were performed to obtain the battery capacity after 50 cycles. The battery discharging capacity maintaining ratio was calculated and the result are provided in Table 2.

The discharging maintaining ratio=discharging capacity after 50 times cycles/initial discharging capacity*100%

TABLE 2

| Sample | Initial charging specific capacity (mAh/g) | Initial discharging specific capacity (mAh/g) | Discharging capacity maintaining ratio (%) |
|---|---|---|---|
| S4 | 563.82 | 711.04 | 89.32 |
| S5 | 567.05 | 718.39 | 89.21 |
| S6 | 548.4 | 670.04 | 90.86 |
| S7 | 545.05 | 663.2 | 90.23 |
| S8 | 545.72 | 667.14 | 90.52 |
| DBS1 | 352.23 | 390.34 | 91.87 |

Without wishing to be bound by the theory Applicants believe that Table 2 illustrates that by adopting the negative active materials prepared according to the embodiments of the present disclosure in the lithium ion batteries, the capacity and the cycling performance were improved.

Figure 11:
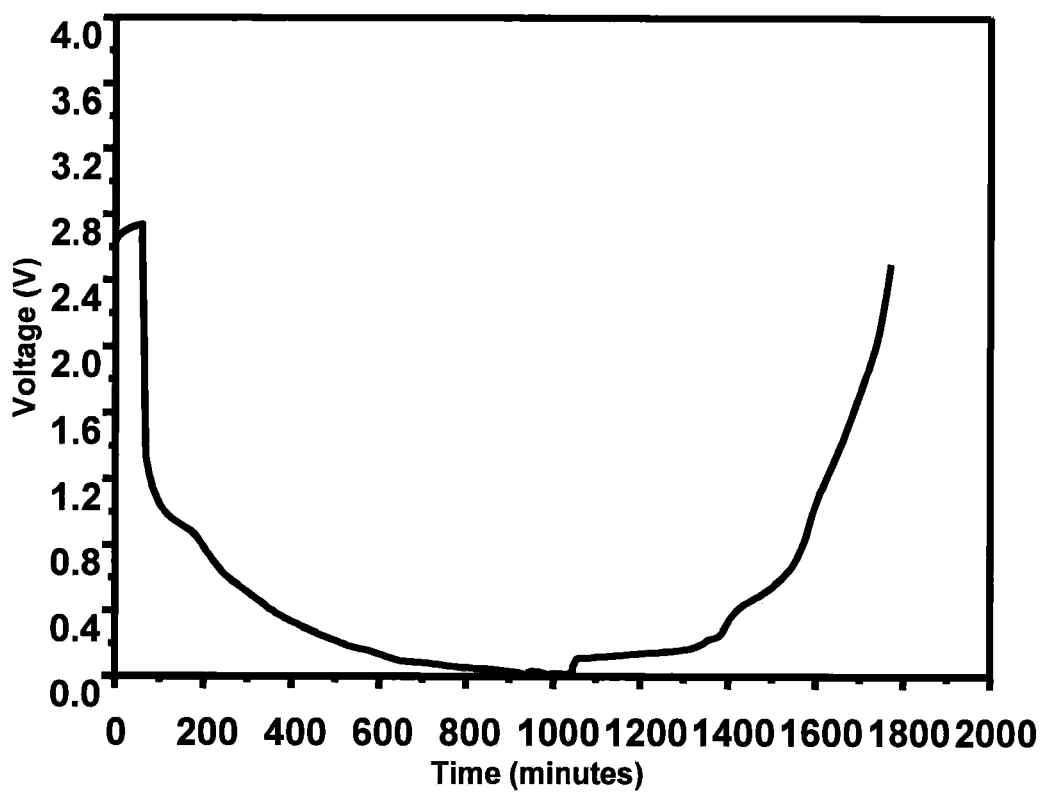
FIG. 11 illustrates a specific capacity testing result of an illustrative battery sample S4.
Figure 12:
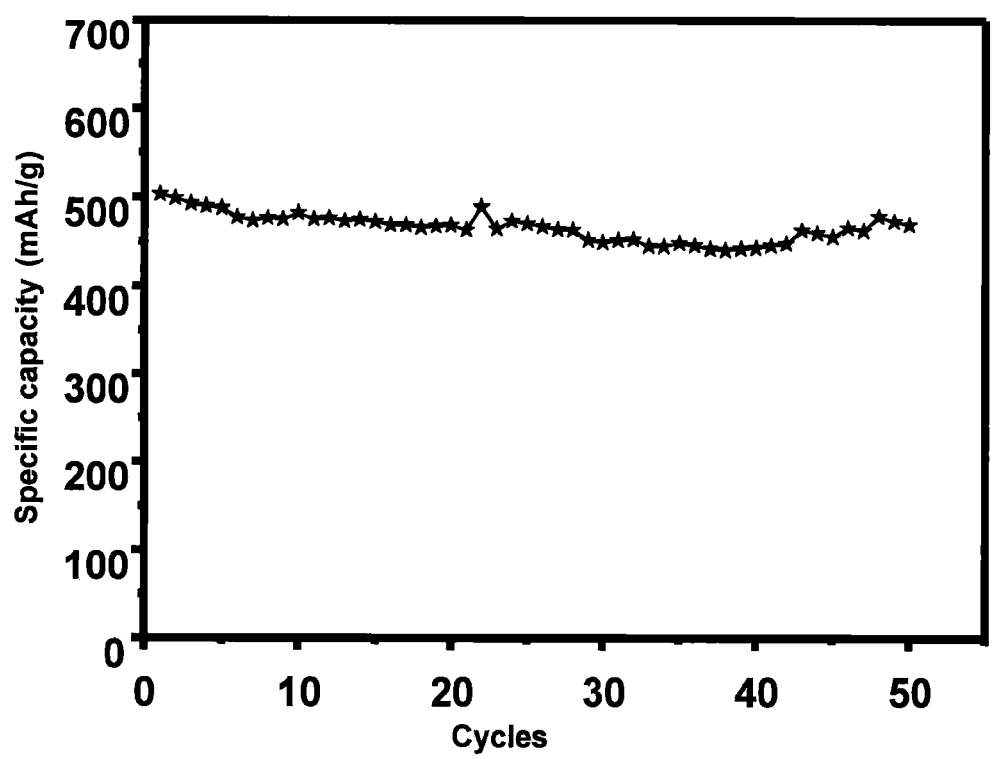
FIG. 12 illustrates a cycling performance testing result of the illustrative battery sample S4.
Figure 13:
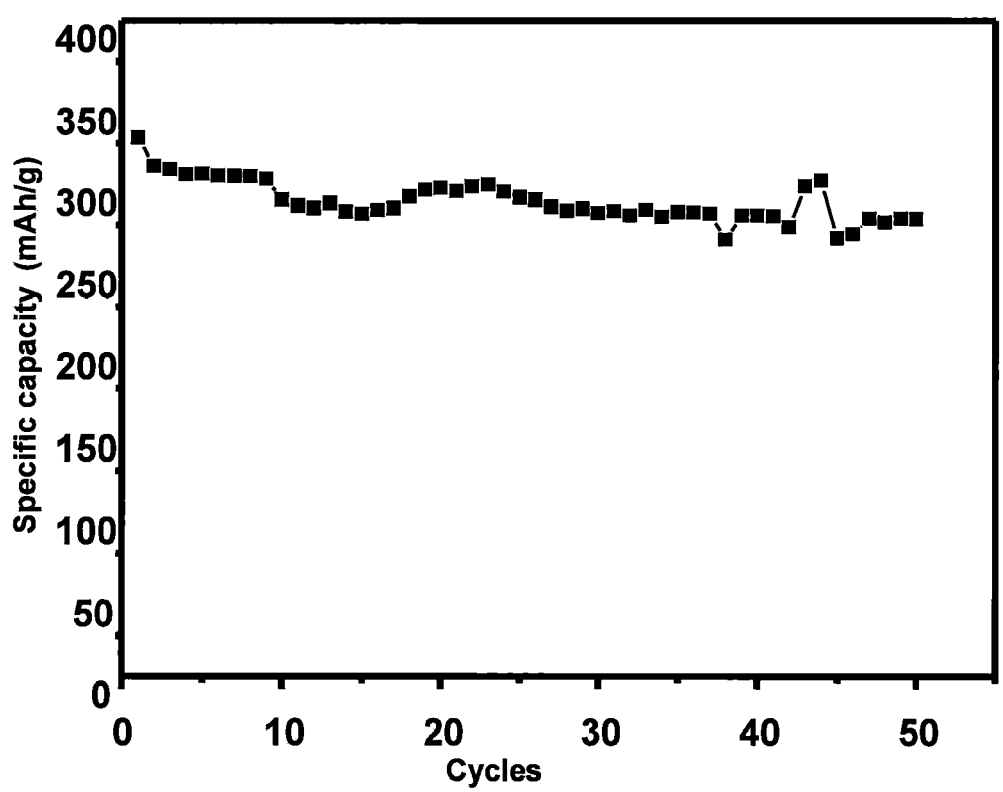
FIG. 13 illustrates a cycling performance testing result of an alternative battery sample DBS1.

Applicants further believe, without limitation, that FIGS. 11 to 13 illustrate (in which FIG. 11 illustrates a specific capacity testing result of the sample S4) that the specific capacity was enhanced greatly. In particular and without limitation, Applicants believe that compared to the cycling performance of the battery DBS1 in FIG. 13, the cycling performance of the battery sample S4 illustrated in FIG. 12 did not have an obvious difference.

In an embodiment, provided herein are negative electrode materials, comprising a negative active material, a binding agent and a conductive agent, wherein, the negative active material has: 1) an initial charging specific capacity greater than about 500 mAh/g, alternatively greater than about 550 mAh/g, alternatively greater than about 600 mAh/g; 2) an initial discharging specific capacity greater than about 600 mAh/g, alternatively greater than about 650 mAh/g, alternatively greater than about 700 mAh/g; 3) and a discharging capacity maintaining ratio greater than about 85 percent;

alternatively granter than about 90 percent; alternatively greater than about 95 percent. Also provided herein are methods of preparing negative active materials, wherein the negative active materials have: 1) an initial charging specific capacity greater than about 500 mAh/g, alternatively greater than about 550 mAh/g, alternatively greater than about 600 mAh/g; 2) an initial discharging specific capacity greater than about 600 mAh/g, alternatively greater than about 650 mAh/g, alternatively greater than about 700 mAh/g; 3) and a discharging capacity maintaining ratio greater than about 85 percent; alternatively granter than about 90 percent; alternatively greater than about 95 percent.

Although explanatory embodiments have been shown and described, it would be appreciated by those skilled in the art that changes, alternatives, and modifications may be made in the embodiments without departing from spirit and principles of the disclosed negative active materials, lithium-ion batteries, and methods thereof. Such changes, alternatives, and modifications all fall into the scope of the claims and their equivalents.

What is claimed is:

1. A method for the preparation of a negative active material comprising:
   mixing a carbon material, an organic polymer, a Sn-containing compound with water to obtain a mixed solution system;
   adding a complexing agent to the mixed solution system, optionally while stirring, to form an intermediate solution;
   adding a reducing agent to the intermediate solution to form a reaction product; and
   filtering, washing, and drying the reaction product to form the negative active material, wherein the negative active material has a core-shell structure, a core of the core-shell structure comprising carbon and a shell of the core-shell structure comprising Sn, wherein the mixed solution system further comprises: a first water soluble aiding compound additive, the first water soluble aiding compound additive comprises one or more aiding elements selected from group consisting of: Ag, Zn, Al, and Sb; wherein a weight ratio of the first water soluble aiding compound additive and the Sn-containing compound ranges from about 0.04 to about 0.2: about 1.

2. The method of claim 1, further comprising: sintering the negative active material in a vacuum, or a protective atmosphere.

3. The method of claim 2, wherein sintering is done when the negative active material is at a temperature ranging from about 300 degrees Celsius to about 900 degrees Celsius.

4. The method of claim 1, wherein the carbon material is graphite, further comprising activating the carbon material before it is mixed with the organic polymer, the Sn-containing compound, and water to obtain the mixed solution system, the activating step including, under stirring conditions, mixing the graphite with an acid solution to form a graphite-acid mixture, heating the graphite-acid mixture to temperature ranging from about 60 degrees Celsius to about 100 degrees Celsius, and maintaining the graphite-acid mixture at one or more temperatures ranging from about 60 degrees Celsius to about 100 degrees Celsius for a time ranging from about 2 hours to about 5 hours.

5. The method of claim 4, the temperature of the intermediate solution is maintained at a temperature ranging from about 70 degrees Celsius to about 90 degrees Celsius while the reducing agent is added, and wherein the reaction product is filtered by suction filtering, wherein the reaction product is washed with deionized water, wherein the reaction product is dried in vacuum under a temperature ranging from about 80 degrees Celsius to about 100 degrees Celsius.

6. The method of claim 4, wherein the carbon material is one or more selected from the group consisting of: sphere natural graphite, sheet natural graphite, sphere artificial graphite, sheet artificial graphite, hard carbon, and MCMB; the acid is one or more selected from the group consisting of: hydrochloric acid, sulphuric acid, and nitric acid; the organic polymer is one or more selected from group consisting of: asphaltum, PEO-PPO-PEO, PVDF and PTFE; the Sn-containing compound is one or more selected from the group consisting of: tin sulphate, tin chloride, and tin monosulphate.

7. The method of claim 1, wherein the weight ratio of graphite, organic polymer, tin-containing compound ranges from about 1 to about 4: from about 0.1 to about 0.4: about 1, respectfully.

8. The method of claim 1, wherein the complexing agent is one or more selected from the group consisting of: citric acid, tartaric acid, sodium ethylene diamine tetracetate, and sodium succinate; a weight ratio of the complexing agent to the Sn-containing compound ranges from about 0.8 to about 3: about 1.

9. The method of claim 1, wherein the reducing agent is one or more selected from the group consisting of: sodium borohydride, acetaldehyde, formaldehyde, and sodium hypophosphite; wherein a weight ratio of reducing agent to Sn-containing compound ranges from about 2.7 to about 6: about 1.

10. The method of claim 1, wherein the mixed solution system further comprises a second water soluble aiding compound, the second water soluble aiding compound comprises one or more aiding elements selected from the group consisting of: Co, Ni, Cu, Cr, Fe, P, Si, and B; wherein a weight ratio of the second water soluble aiding compound and the Sn-containing compound ranges from about 0.04 to about 0.2: about 1.

11. A method comprising:
    mixing, while stirring, a graphite with an acid selected from the group consisting of hydrochloric acid, sulphuric acid and nitric acid to form a graphite mixture, heating the graphite mixture to a temperature ranging from about 60 degrees Celsius to about 100 degrees Celsius, and maintaining the graphite-acid mixture at one or more temperatures ranging from about 60 degrees Celsius to about 100 degrees Celsius for a time ranging from about 2 hours to about 5 hours;
    filtering and then drying the graphite mixture to obtain a treated graphite;
    mixing the treated graphite with the organic polymer to form a graphite-organic-polymer mixture;
    mixed the graphite-organic-polymer mixture with a Sn-containing compound and water to obtain a mixed solution system solution;
    adding a complexing agent into the mixed solution system, optionally while stirring, to form an intermediate solution;
    adding a reducing agent to the intermediate solution, when the intermediate solution is at a temperature ranging from about 70 degrees Celsius to about 90 degrees Celsius, to form a reaction product,
    filtering, washing with de-ionized water, and vacuum drying the reaction product, wherein the temperature during vacuum drying ranges from about 80 degrees Celsius to about 100 degrees Celsius, sintering the reaction product in a vacuum, or protection atmosphere, at about temperature ranging from about 300 degrees Celsius to about 900 degrees Celsius.

12. The method of claim 1, wherein the organic polymer is one or more selected from the group consisting of: asphalt or polyoxyethylene-polyorxypropylene polyorxyethylene, the Sn-containing compound is one or more selected from the group consisting of: tin sulfate and tin chloride; the complexing agent is one or more selected from the group consisting of: citric acid, tartaric acid, sodium ethylene diamine tetracetate, and sodium succinate; the reducing agent is one or more selected from group consisting of: sodium borohydride, acetaldehyde, formaldehyde, and sodium hypophosphite; wherein the first water soluble aiding compound additive is one or more selected from the group consisting of: sulphate, chloride, nitrate salts of zinc, and nitrate salts of aluminum; the second water soluble aiding compound additive is one or more selected from the group consisting of: sulphate, chloride, nitrate salts of cobalt, nitrate salts of nickel, nitrate salts of iron, nitrate salts of chromium, compounds of P, B or Si, and oxidations of P, B or Si.

* * * * *